United States Patent [19]
Suchowski

[11] 3,877,138
[45] Apr. 15, 1975

[54] METHOD OF MAKING MITER FRAME CORNER CONSTRUCTION

[75] Inventor: Bernard Suchowski, New York, N.Y.

[73] Assignee: The Hartz Mountain Corporation, Harrison, N.J.

[22] Filed: Apr. 25, 1973

[21] Appl. No.: 354,207

Related U.S. Application Data

[62] Division of Ser. No. 174,779, Aug. 25, 1972, Pat. No. 3,767,237.

[52] U.S. Cl. ............... 29/468; 29/505; 29/513; 113/116 F; 113/116 HA
[51] Int. Cl. ............................................. B23q 3/00
[58] Field of Search ............ 29/468, 505, 509, 515, 29/521, 522, 243.5; 113/116 F, 116 G, 116 HA; 403/295, 231, 219

[56] References Cited
UNITED STATES PATENTS

| | | | |
|---|---|---|---|
| 2,703,159 | 3/1955 | Fleet | 29/521 |
| 2,733,788 | 2/1956 | Farmer | 403/295 |
| 2,804,952 | 9/1957 | Nothdurft | 403/295 |
| 2,861,659 | 11/1958 | Hagerty et al. | 403/231 |
| 2,917,792 | 12/1959 | Franzblau et al. | 403/295 |
| 3,144,265 | 8/1964 | Humble | 403/219 |
| 3,342,514 | 9/1967 | Ivanhoe et al. | 403/295 |
| 3,351,367 | 11/1967 | Beckman | 403/295 |

Primary Examiner—C. W. Lanham
Assistant Examiner—James R. Duzan

[57] ABSTRACT

A method of making a miter corner construction for multiple-panelled enclosures, such as aquarium tanks, comprising a frame corner formed of three mutually perpendicular members and a three-branched connector clip positioned within the corner. The miter end portions of the three frame members are first slipped over the respective branches of the clip until the members are in mated engagement. Then, by a single swedging action, portions of the ribs are swedged into adjacent notched portions of the respective clip branches, and at the same time other selected portions of the ribs are swedged into overlapping engagement with the respective adjacent clip branches.

1 Claim, 9 Drawing Figures

PATENTED APR 15 1975

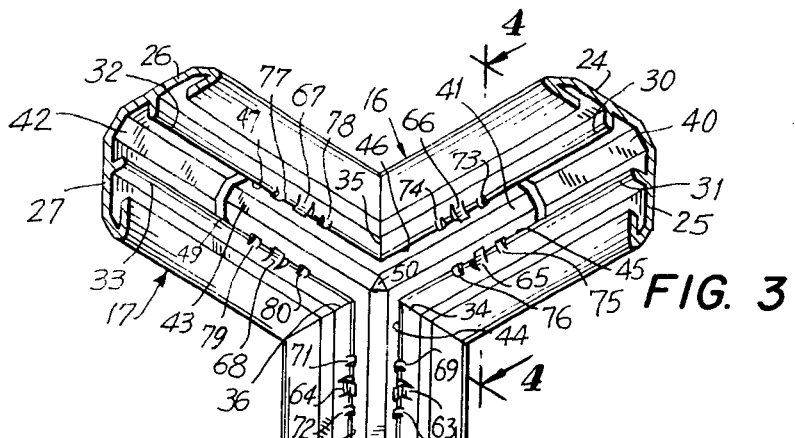
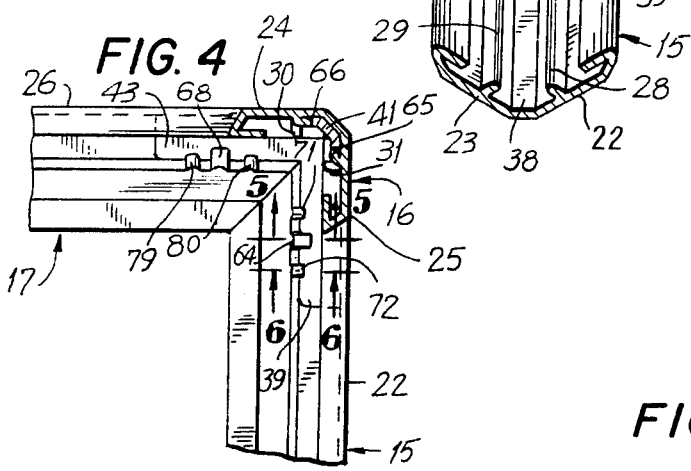
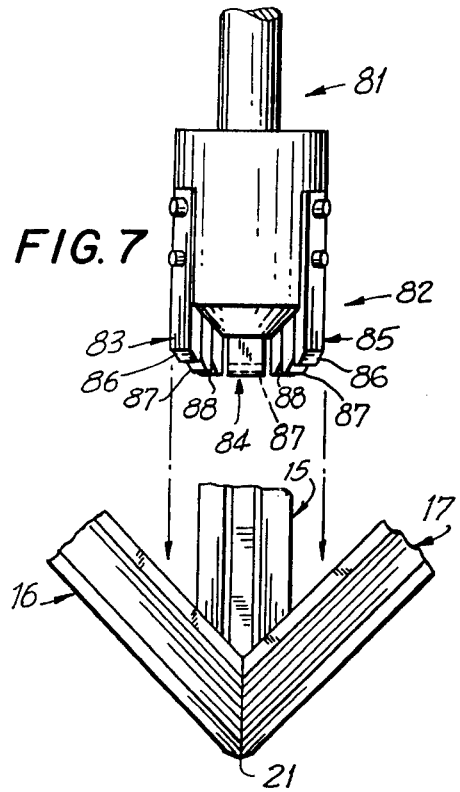
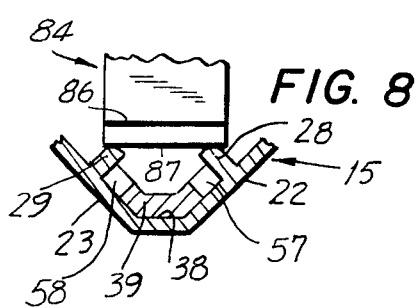
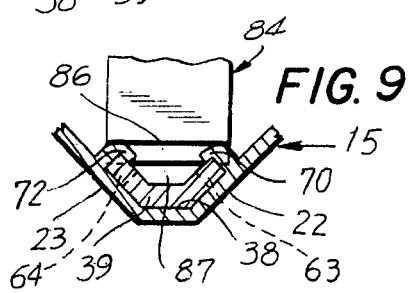

METHOD OF MAKING MITER FRAME CORNER CONSTRUCTION

This application is a division of application Ser. No. 174,779, filed Aug. 25, 1972, now U.S. Pat. No. 3,767,237.

BACKGROUND OF THE INVENTION

1. The Field of the Invention

This invention relates to a method of making a miter frame corner constructions, and is especially, although not exclusively, directed to corner constructions for home aquariums.

2. The Known Art

It is a common expedient to employ fastening means to hold in assembled relation two or more frame members with adjacent mitered joints. It is particularly recognized that in aquarium tanks where the peripheries and corners of the glass panels are provided with mated frame members there must be perfect water tight mating of the adjacent ends of the frame members and of the glass panels. In attempts to accomplish such results multi-branched clips or corner blocks have been employed requiring the use of special fasteners and manual fastening operations, including drilling of holes and applying screws and rivets to complementary frame members. Such expedients not only involve costly time and labor factors, but also often result in loose mitered joints due to faulty manual operations; and besides, drilled holes are subject to leakage when employed in aquariums. Where the frame members are made of extruded aluminum — the use of which has been found expedient for home aquarium tanks — force-fit clips have at times been used; but such use has frequently resulted in loose joints, mainly because close dimensional tolerances are not generally attainable in extruded frame members of aluminum or other extrudable material. It has been found that even if such force-fit clips can prevent relative displacement of adjacent frame members in say a longitudinal direction, there is still danger of their relative displacement in a transverse direction due to a loose transverse fit, thereby producing a loose mitered joint.

OBJECTIVES OF THE INVENTION

It is the main objective of this invention to provide a relatively simple, tightly mitered corner construction by a readily performed method of making same, with none of the aforesaid shortcomings. And it is a further object to employ this invention for effective use with a frame whose components are made of extruded aluminum or other material of similar structural properties. Additionally, among the objects of this invention are: the provision of means enabling adjacent frame members, particularly three mutually perpendicular members such as are employed in conjunction with home aquarium tanks, to be quickly and effectively joined into operative assembled relation, with their adjacent miter surfaces in pressing and matched engagement; the provision of multi-branched corner clips securely connected to the corners of a frame structure of the above-mentioned category, without the use of separate fasteners; and the employment of a simple forming operation to secure said clip embodiment to the corner of a frame structure whereby the clip and adjacent frame members are held against relative movement.

Other objects, features and advantages will appear from the drawings and the description hereafter given.

SUMMARY OF THE INVENTION

In the preferred manner of practicing this invention as applied to a frame corner formed of three mutually perpendicular mated members, a correspondingly proportioned three-branched connector clip is positioned within the said corner with one of said branches disposed within a corresponding one of said members. Each of the frame members comprises two lateral longitudinally extending walls in right-angled relation, each wall having a longitudinally extending rib, whereby the pair of ribs of each member defines therebetween a longitudinal cavity. In the preferred construction, the respective longitudinal center lines of each pair of ribs meet the respective longitudinal center lines of the corresponding ribs of the other of said members at their respective mated surfaces.

Each of the three branches of the said connector clip includes two lateral longitudinally extending walls in right-angled relation, each branch being positioned within the cavity and between the pair of ribs of its said corresponding member with the opposite lateral edges of the branch adjacent the two flanking ribs. The said ribs are of greater height than the thickness of the respective adjacent walls of said branches. The said lateral edges of said branches are notched, the portion of each rib adjacent a notched portion being swedged into the notched portion, and other portions of said ribs being swedged inwardly into overlying engagement with the walls of the respective adjacent branches.

The arrangement is hence such that the three branches of the clip are held against both longitudinal and transverse movement with respect to the frame members. Since the said connector clip is of one piece, the three frame members are held locked against movement from their mated positions.

In the preferred method of making the construction above described, the miter end portions of the three frame members are first slipped over the respective branches of the connector clip until the said members are in mated engagement. Then, by a single swedging action, portions of the ribs are swedged into the adjacent notched portions of the respective clip branches, and at the same time other selected portions of the ribs are deformed by swedging them into overlapping engagement with the respective adjacent clip branches.

DESCRIPTION OF THE DRAWINGS

FIG. 3 is a fragmentary perspective view of the components of FIGS. 1 and 2 in their final assembled positions and operatively locked in place by the swedging action constituting part of the method of this invention.

FIG. 4 is a part sectional, part plan view of FIG. 3, the section being taken transversely substantially along line 4—4 of one of said frame members, the other two members being shown in fragmentary plan views.

FIG. 7 is a fragmentary elevational view of the movable die member in raised inoperative position relative to the assembly of connector clip and the corner portion of three frame members prior to the swedging action.

FIG. 8 is a semi-diagramatic transverse sectional view of one of the frame members of FIG. 7 showing the forming die just prior to its swedging engagement with the laterally opposite ribs of the member, the section being taken along line 5—5 of FIG. 4.

FIG. 9 is a view substantially like FIG. 8 but showing the position of the die upon the completion of its operative stroke, the section being taken along line 6—6 of FIG. 4.

DESCRIPTION OF PREFERRED EMBODIMENT

Figures 1, 2, 5, 6:
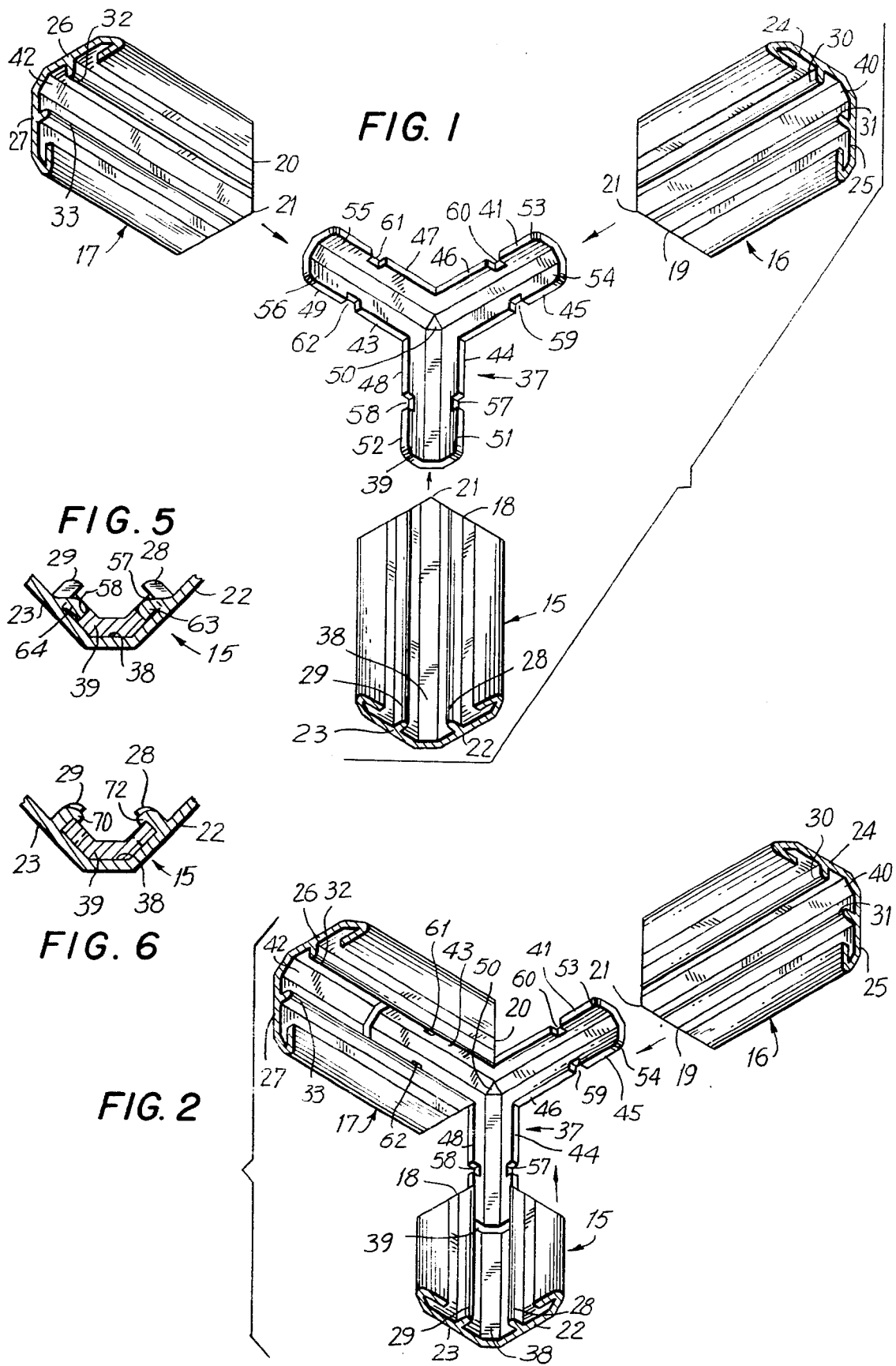
FIG. 1 is an exploded perspective view of the three-branched connector clip and fragmentary portions of the three frame members comprising the components of the corner construction employed in the method of practicing this invention.
FIG. 2 is a perspective view of the components of FIG. 1 in partial assembled relation, one of the frame members being shown in its final position on the clip, another being shown in the process of being slipped over one of the branches of the clip, and the other in a position just prior to its engagement with a clip branch.
FIG. 5 is a fragmentary section of FIG. 4 taken along line 5—5.
FIG. 6 is a fragmentary section of FIG. 4 taken along line 6—6.

In the preferred form of a structure employed in the method of this invention, the illustrated three frame members 15, 16 and 17 are so proportioned that when operatively assembled in mutual right angular relation they form a peripheral frame for an enclosure, such as an aquarium tank. The respective forward ends 18, 19 and 20 of said members are mated so as to form a miter corner 21, the opposite ends, not shown, being similarly mated. Each frame member has two lateral longitudinally extending walls in right-angled relation, such pairs of walls 22,23 and 24,25 and 26,27 being parts of the respective frame members 15,16 and 17. Integral with walls 22 and 23 are the pair of ribs 28 and 29, integral with walls 24 and 25 are the pair of ribs 30 and 31 and integral with walls 26 and 27 are the pair of ribs 32 and 33, the ribs of each pair being in spaced parallel relation, the said pairs of ribs being in mutually right-angled relation and extending in directions along longitudinal lines that meet at their respective mated ends. In the particular preferred form illustrated, the corresponding ribs meet at their respective mated ends, corresponding ribs 28 and 31 meeting at their mated juncture 34, corresponding ribs 30 and 32 meeting at their mated juncture 35 and corresponding ribs 29 and 33 meeting at their mated juncture 36.

The arrangement is such that each pair of ribs forms therebetween a cavity for operatively accommodating therein one of the branches of the three branched connector clip 37. The ribs 28 and 29 form the cavity 38 within which is disposed the clip branch 39; the ribs 30 and 31 form the cavity 40 within which is disposed the clip branch 41; and ribs 32 and 33 form the cavity 42 within which is disposed the clip branch 43.

In the construction shown in the drawings, the said corresponding ribs 28 and 31 form a right-angular rib section which is embraced by the corresponding lateral edges 44 and 45 of the respective clip branches 39 and 41; the corresponding ribs 30 and 32 form a right-angular rib section embraced by the corresponding lateral edges 46 and 47 of the respective branches 41 and 43; and the corresponding ribs 29 and 33 form a right angled rib section embraced by the corresponding lateral edges 48 and 49 of the respective branches 39 and 43. The corner portion 50 of said clip 37 is nested in said corner 21 of the mated frame members.

Each of the clip branches has two lateral longitudinally extending walls in right-angled relation. Specifically, such walls are 51 and 52 on branch 39, walls 53 and 54 on branch 41 and walls 55 and 56 on branch 43. Walls 51 and 52 of branch 39 are in overlying engagement with the respective walls 22 and 23 of member 15, walls 53 and 54 of branch 41 are in overlying engagement with the respective walls 24 and 25 of member 16, and walls 55 and 56 of branch 43 are in overlying engagement with the respective walls 26 and 27 of member 17.

At the lateral edges 44 and 48 of said walls 51 and 52 are the respective notched portions 57 and 58; at the lateral edges 45 and 46 of said walls 54 and 53 are the respective notched portions 59 and 60; and at the lateral edges 47 and 49 of walls 55 and 56 are the respective notched portions 61 and 62. The height of each of the ribs is greater than the thickness of the adjacent clip branch. Thus, as clearly shown in FIG. 4, the ribs 30 and 31 are higher than the thickness of the adjacent clip branch 41, the said ribs extending above the adjacent walls of the clip branch. Sections of said ribs — preferably of all of the ribs — are swedged transversely inwardly, the sections adjacent the notches being peened or swedged into and in interlocking engagement with the respective notched portions, other sections being peened or swedged into overlapping engagement with the adjacent clip branch walls. Specifically, sections 63 and 64 are rib extensions interengaged with the respective notches 57 and 58; sections 65 and 66 are rib extensions interengaged with the respective notches 59 and 60; and sections 67 and 68 are rib extensions interengaged with the respective notches 61 and 62. Rib sections 69, 70, 71 and 72 are rib extensions overlying clip branch 39; rib sections 73, 74, 75 and 76 are rib extensions overlying clip branch 41; and rib sections 77, 78, 79 and 80 are rib extensions overlying clip branch 43.

The arrangement is hence such that the interengaged rib sections 63 to 68, inclusive, prevent longitudinal movement of the connector clip 37 with respect to the frame members 15, 16 and 17, the overlying rib sections 69 to 80, inclusive, prevent upward transverse movements of the clip 37 with respect to said frame members — downward transverse movements being prevented by the walls 22 to 27, inclusive, of the said frame members, and lateral transverse movements being prevented by the respective pairs of ribs, 28, 29 and 30, 31 and 32, 33. Thus the connector clip and the three frame members are held locked against any movement relative to each other.

In the method of making the corner construction above described, the three frame members 15, 16 and 17 are first interengaged with the respective clip branches 39, 41 and 43, said members being then slidably moved towards each other over said branches until their mated ends 18, 19 and 20 meet at the miter corner 21. The assembly is then placed in a punch press under the movable die member 81, the said assembly being cradled in a supporting die (not shown) of conventional construction. The forming punch 82 of the die member has three sets of die elements, sets 83, 84 and 85, these being proportioned and positioned for operative engagement with the three underlying frame and clip branch portions for deforming the engaged rib sections transversely inwardly and downwardly. Each of said sets comprises forming die elements 86, 87 and 88. The central die element 87 is of greater effective length than the two flanking die elements 86 and 88, since it must be of sufficient length to force the engaged rib sections, such as sections 63 and 64, deeply into the corresponding notches, such as notches 57 and 58. The said flanking die elements 86 and 88 are of sufficient length to force the engaged rib portions into position in overlying engagement with the adjacent clip branch sections. Each of the die elements is of sufficient width operatively to engage both ribs of the underlying frame member. The operations of swedging the selected rib sections into the notches and over the clip branches are performed by one stroke of the punch, in known manner.

By the method above described, involving the steps of sliding the frame members over the clip branches and effecting a single punch press stroke, the aforesaid rigid miter corner construction is produced.

In the above description, the invention has been disclosed merely by way of example and in preferred manner; but obviously many variations and modifications may be made therein. It is to be understood, therefore, that the invention is not limited to any particular form or manner of practicing same.

I claim:

1. A method of making a miter corner construction comprising the steps of providing three frame members proportioned for mated engagement at their respective forward ends, each frame member having two spaced parallel longitudinally extending ribs forming a cavity therebetween, providing a three-branched connector clip proportioned for slidable placement within said respective cavities, the thickness of said respective branches being less than the height of the adjacent ribs, the laterally opposite edges of said branches having notched portions therein, slidably interengaging said three frame members with the respective corresponding branches of said connector clip, slidably moving said members towards each other along said respective branches until the forward ends of the members come into mutual mated engagement, whereby said branches are disposed within corresponding cavities of said members and the ribs extend above the adjacent clip branches, moving a swaging tool along a substantially single unidirectional path toward and into contact with the interengaged frame members and connector clip, thereby in a single operation swaging sections of said respective ribs inwardly into the notched portions of the adjacent branches and simultaneously swaging other selected sections of said respective ribs inwardly into overlying engagement with the adjacent branches, whereby said frame members and said connector clip are thereafter held locked against both transverse and longitudinal movement relative to each other.

* * * * *